(12) United States Patent
Gersztenkorn (10) Patent No.: US 6,594,585 B1
(45) Date of Patent: Jul. 15, 2003

(54) METHOD OF FREQUENCY DOMAIN SEISMIC ATTRIBUTE GENERATION

(75) Inventor: Adam Gersztenkorn, Tulsa, OK (US)

(73) Assignee: BP Corporation North America, Inc., Chicago, IL (US)

( * ) Notice: Subject to any disclaimer, the term of this patent is extended or adjusted under 35 U.S.C. 154(b) by 160 days.

(21) Appl. No.: 09/594,899

(22) Filed: Jun. 15, 2000

(Under 37 CFR 1.47)

Related U.S. Application Data

(60) Provisional application No. 60/139,637, filed on Jun. 17, 1999.

(51) Int. Cl.[7] .................................................. G01V 1/28
(52) U.S. Cl. .............................. 702/14; 702/16; 702/17
(58) Field of Search .................................... 702/14, 16

(56) References Cited

U.S. PATENT DOCUMENTS

| | | |
|---|---|---|
| 5,563,949 A | 10/1996 | Bahorich et al. |
| 5,892,732 A | 4/1999 | Gersztenkorn |
| 5,940,778 A | 8/1999 | Marfurt et al. |
| 6,131,071 A * | 10/2000 | Partyka et al. ................ 702/16 |

OTHER PUBLICATIONS

Allam, Mahmoud et al.: "Spatial–Temporal DFT Projection for Wideband Array Processing", *IEEE Signal Processing Letters*, vol. 1, No. 2, 1994, pp. 35–37.
Bahorich, Mike: "3–D seismic discontinuity for faults and stratigraphic features: The coherence cube", *The Leading Edge*, 1995, pp. 1053–1058.
Brigman, E. Oran: "Discrete Convolution and Correlation", *The Fast Fourier Transform*, Prentice–Hall, Inc., 1974, pp. 110–122.
Castagna, John P et al., Editors: "AVO Analysis—Tutorial and Review", *Offset–Dependant Reflectivity—Theory and Practice of AVO Analysis*, Society of Exploration Geophysicists, 1993, pp. 3–36.
Dahlquist, Germund et al.: "Computation of Eigenvalues and Eigenvectors", *Numerical Methods*, Prentice–Hall, Inc., 1974, pp. 208–211.
Marfurt, Kurt J. et al.: "Pitfalls of using conventional and discrete Radon transforms on poorly sampled data", *Geophysics*, vol. 61, No. 5, 1996, pp. 1467–1482.
Owsley, Norman L.: "Sonar Array Processing", *Array Signal Processing*, Prentice–Hall, Inc., 1985, pp. 115–193.

(List continued on next page.)

Primary Examiner—Edward Lefkowitz
Assistant Examiner—Anthony Gutierrez
(74) Attorney, Agent, or Firm—Fellers, Snider, Blankenship, Bailey & Tippen, P.C.

(57) ABSTRACT

The instant invention teaches an improved frequency domain based method of generating attributes from 2D or 3D seismic data. The central idea of the instant invention is that if a curve characterized by constant coefficients is fitted to a short-window Fourier transform amplitude or phase spectrum, the coefficient estimates that are obtained thereby can be used as seismic attributes for use in detecting changes in subsurface properties that may be associated with the generation, migration, accumulation, or presence of hydrocarbons. Since it is well known that many subsurface structural and stratigraphic features alter the frequency characteristics of seismic waveforms passing therethrough, the instant invention provides a new way to search through large numbers of seismic traces for frequency changes that may be correlated with subsurface features of exploration interest.

15 Claims, 5 Drawing Sheets

OTHER PUBLICATIONS

Taner, M.T. et al.: "Complex seismic trace analysis", *Geophysics*, vol. 44, No. 6, Society of Exploration Geophysicists, 1979, pp. 1041–1063.

Wax, Mati et al: "Spatio–Temporal Spectral Analysis By Eigenstructure Methods", *IEEE Transactions of Acoustics, Speech, and Signal Processing*, vol. ASSP–32, No. 4, 1984, pp. 817–827.

Yilmaz, Özdogan: "The 2–D Fourier Transform", *Seismic Data Processing*, Society of Exploration Geophysicists, 1987, pp. 62–79.

Yilmaz, Özdogan: "3–D Seismic Exploration", *Seismic Data Processing*, Society of Exploration Geophysicists, 1987, pp. 384–427.

* cited by examiner

METHOD OF FREQUENCY DOMAIN SEISMIC ATTRIBUTE GENERATION

RELATED APPLICATIONS

This application claims priority from provisional U.S. application Ser. No. 60/139,637 filed on Jun. 17, 1999, the disclosure of which is incorporated herein by reference.

TECHNICAL FIELD

The present invention relates generally to the field of seismic exploration and, in more particular, to methods of quantifying and visualizing subsurface structural and stratigraphic features in two and three dimensions. This invention also relates to the field of seismic attribute generation and the use of seismic attributes to detect the presence of hydrocarbons in the subsurface. Additionally, it relates to the correlation of seismic attributes with subsurface features that are conducive to the migration, accumulation, and presence of hydrocarbons. The invention disclosed herein will be most fully appreciated by those in the seismic interpretation and seismic processing arts.

BACKGROUND

A seismic survey represents an attempt to map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is moved to various positions across the surface of the earth above a geological structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single straight line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both methods interrogate some volume of the earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. The term "unstacked" seismic traces is used by those skilled in the art to describe seismic traces as they are collected in field recordings. This term also is applied to seismic traces during the processing sequence up to the point where traces are "stacked" or averaged together. General background information pertaining 3D data acquisition and processing may be found in Chapter 6, pages 384–427, of Seismic Data Processing by Ozdogan Yilmaz, Society of Exploration Geophysicists, 1987, the disclosure of which is incorporated herein by reference. Chapter 1, pages 9 to 89, of Yilmaz contains general information relating to conventional 2D processing and that disclosure is also incorporated herein by reference.

A modern seismic trace is a digital recording (analog recordings were used in the past) of the energy reflecting back from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Thus, each digital sample in a seismic trace is associated with a travel time (in the case of reflected energy, a two-way travel time from the surface to the reflector and back to the surface again). Further, the surface location of each trace in a seismic survey is carefully recorded and remains associated with that trace during subsequent processing. This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be extracted from a stacked or unstacked seismic volume by collecting all of the digital samples that occur at the same travel time. This operation results in a 2D plane of seismic data. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation subsequently applied to seismic data collected over other exploration targets.

That being said, one of the most challenging tasks facing the seismic interpreter—one of the individuals within an oil company that is responsible for reviewing and analyzing the collected seismic data—is locating these stratigraphic and structural features of interest within individual seismic lines or, more problematically, within potentially enormous seismic volumes. By way of example only, it can be important for exploration purposes to locate regions in the subsurface in which the frequency content of seismic events reflected therefrom and transmitted therethrough are different from the surrounding rocks, as these oft-times subtle frequency changes may be indicative of the presence of fluids (including gas) in the subsurface rocks. Additionally, rock stratigraphic information may be revealed through the analysis of spatial variations in a seismic reflector's character because these variations may often be empirically correlated with changes in reservoir lithology or fluid content. Since the precise physical mechanism which gives rise to these variations may not be well understood, it is common practice for interpreters to calculate a variety of attributes from the recorded seismic data and then plot or map them, looking for an attribute that has some predictive value. Given the enormous amount of data collected in a 3-D volume, further automated methods of enhancing the appearance of subsurface features related to the migration, accumulation, and presence of hydrocarbons are sorely needed.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The instant inventor has discovered an improved frequency domain based method of generating attributes from 2D or 3D seismic data. The central idea of the instant invention is that if a curve characterized by one or more constant coefficients is fitted to a Fourier transform amplitude or phase spectrum that has been calculated over a relatively short time window, the coefficient estimates that are obtained thereby are seismic attributes that can be used to detect changes in subsurface properties that may be associated with the generation, migration, accumulation, or presence of hydrocarbons. Since it is well known that many subsurface structural and stratigraphic features alter the frequency characteristics of seismic waveforms passing therethrough, the instant invention provides a new way to search through large numbers of seismic traces for frequency changes that may be correlated with subsurface features of exploration interest.

As a preliminary step, the instant method typically begins with the selection of an input 2D or 3D seismic data set that has been collected over a predetermined volume of the earth that contains structural or stratigraphic features of interest to the explorationist. The selected seismic traces may either be stacked or unstacked, however stacked seismic traces are the preferred input data for use with this invention.

As a next step, a zone of interest within seismic data is specified and an initial analysis window within the zone of interest is selected. The zone of interest is preferably defined in terms of time (or depth) and lateral extent within the selected seismic data set. The time span of the analysis window will typically be somewhat smaller than that of the zone of interest and the instant inventor contemplates that a series of sliding analysis windows will be used to temporally "cover" the entire zone of interest. In the case of a 3D data set, each analysis window ultimately gives rise to a 2-D "plane" of coefficients—one coefficient being supplied by each seismic trace in the volume—so that, by performing the steps that follow on a large number of windows, a 3-D volume may be constructed by combining the resulting 2-D planes. When the instant method is applied to 2-D seismic data, the output data set (assuming that multiple analysis windows are employed) is again a 2-D data set.

Within each analysis window, a Fourier transform phase or amplitude spectrum is next calculated using the samples contained therein. The resulting spectrum is then fit by a function characterized by constant coefficients, thereby resulting in a collection of coefficient estimates that are associated with this spectrum and function. One of the coefficient estimates from the curve fit is then selected and displayed at the same relative location (in space and time) as the center of the analysis window. This coefficient estimate reflects (depending on which particular coefficient is chosen) some feature related to the overall shape of the spectrum and, hence, the frequency content of the seismic trace from which it was calculated. For example, frequency spectra that are front (i.e., low frequency) loaded can be differentiated from those that are rear (i.e., high frequency) loaded because those spectra have different overall shapes, which shapes will be reflected in the estimated coefficient values. Further, spectra that are unimodal in shape can be differentiated from those that are bimodal (e.g., those spectra that contain a pronounced frequency notch). Clearly, many other variations are possible.

If a number of seismic traces/analysis windows are processed by the previous method, the resulting coefficients can be assembled into seismic traces, lines, slices/planes and volumes which are suitable for viewing by the explorationist. Depending on the particular fitting function and coefficient selected for viewing, the explorationist will in a position to quantitatively assess changing frequency content and changes spectral shape, and to correlate those changes with the subsurface lithology. Since it is well known that subsurface geology can induce changes in the frequency content of seismic data, this method provides a way for the explorationist to rapidly scan large volumes of seismic data for these sorts of changes.

Further, rather than displaying just individual coefficient estimates, mathematical combinations of any number of the calculated coefficients at the same time level and trace may be formed and displayed. Still further, mathematical operations may be performed using coefficient estimates from different time levels in the same trace or between the same time levels on adjacent traces.

Still further, any statistic related to the quality of the curve fit (e.g., statistical correlation or "$R^2$") can also be calculated and used as a seismic attribute. Even further, the display of the resulting seismic attribute might be conditioned on how well each spectrum is fit by the selected equation with, for example, attributes corresponding to "good" fits being displayed while those corresponding to "bad" fits being set to some null value. This would help the explorationist judge whether a particular frequency change was truly representative of the underlying data or was a spurious result based on noise.

Each of the coefficients that results from the above fitting process is a seismic attribute that may be displayed and empirically or automatically correlated with subsurface structure or stratigraphy. The output from the instant method is a new seismic attribute that quantifies the shape of the spectrum and yields an attribute that numerically characterizes that shape. In the past, these frequency spectra could only be examined one-at-a-time, if the goal was to ascertain the overall shape of each spectrum. However, the instant method provides a way to look at large numbers of spectral shapes in their proper spatial relationship and to delimit the areal extent of particular shapes. This method can be used on stacked or unstacked seismic data, 2D or 3D.

While this invention is susceptible of embodiment in many different forms, there is shown in the drawings, and will hereinafter be described in detail, one or more specific embodiments of the instant invention. It should be understood, however, that the present disclosure is to be considered an exemplification of the principles of the inven-

DETAILED DESCRIPTION

Environment of the Invention

Figure 1:
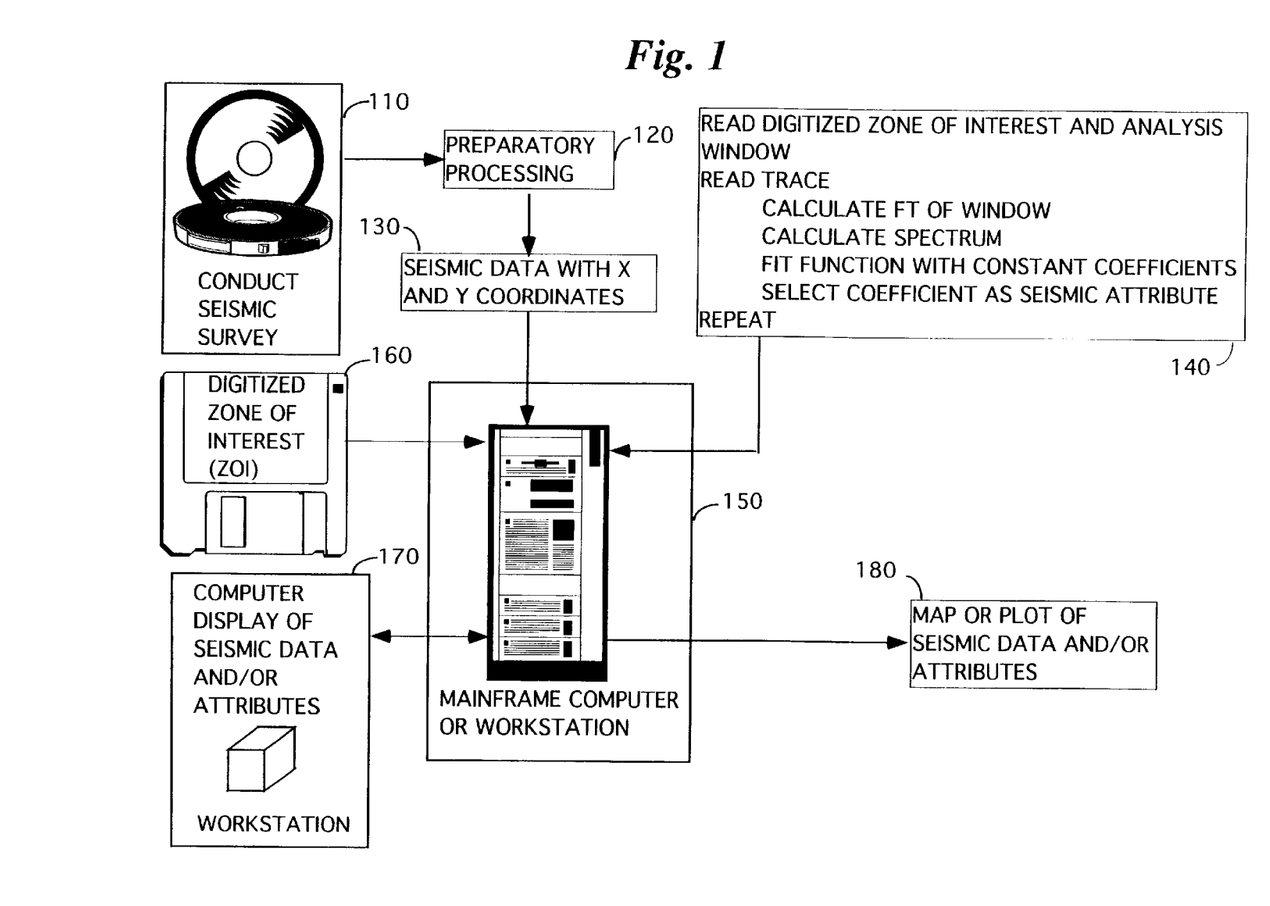
FIG. 1 illustrates the general environment in which the invention disclosed herein would typically be used.

FIG. 1 illustrates the general environment in which the instant invention would typically be used. Seismic data 110 (either 2-D or 3-D) are collected in the field over a subsurface target of potential economic importance and are then taken to a processing center, where a variety of preparatory processes 120 are applied to the seismic traces to make them ready for use by the methods disclosed hereinafter. The preparatory processes typically include the association of an X and Y surface coordinate with every processed trace (e.g., by a geometry routine). The processed traces 130 would then be made available for use by the instant invention and might be stored, by way of example only, on hard disk, magnetic tape, magneto-optical disk, DVD disk, or other mass storage means.

The methods disclosed herein would best be implemented in the form of a compiled computer program 140 that has been loaded onto a general purpose programmable computer 150 where it is accessible by a seismic interpreter or processor. For purposes of the instant disclosure, a general purpose computer 150 will be defined to include, in addition to mainframes and workstations, computers that provide for parallel or massively parallel computations, wherein the computational load is distributed between two or more processors. As is also illustrated in FIG. 1, a digitized zone of interest is preferably also specified and provided as input 160 to the software that implements the instant methods. The exact means by which a zone of interest is determined, digitized, stored, and later read during program execution is unimportant to the instant invention and those skilled in the art will recognize that this might be done any number of ways.

A computer program 140 embodying the instant invention might be conveyed into the computer that is to execute it by means of, for example, a floppy disk, a magnetic disk, a magnetic tape, a magneto-optical disk, an optical disk, a CD-ROM, a DVD disk, or loaded over a network. After the instant methods have been applied, the resulting seismic attribute traces would then typically be displayed either at a high resolution color computer monitor 170 or in hard-copy form as a printed seismic section or a map 180. The traces that result might be a 2D seismic attribute line, a "plane" of seismic attributes, or a seismic attribute volume, although the precise form the output data takes is not a part of the instant invention. The seismic interpreter would then use the displayed images to assist him or her in identifying subsurface features conducive to the generation, migration, accumulation, or presence of hydrocarbons.

Preparatory Processing

Figure 2:
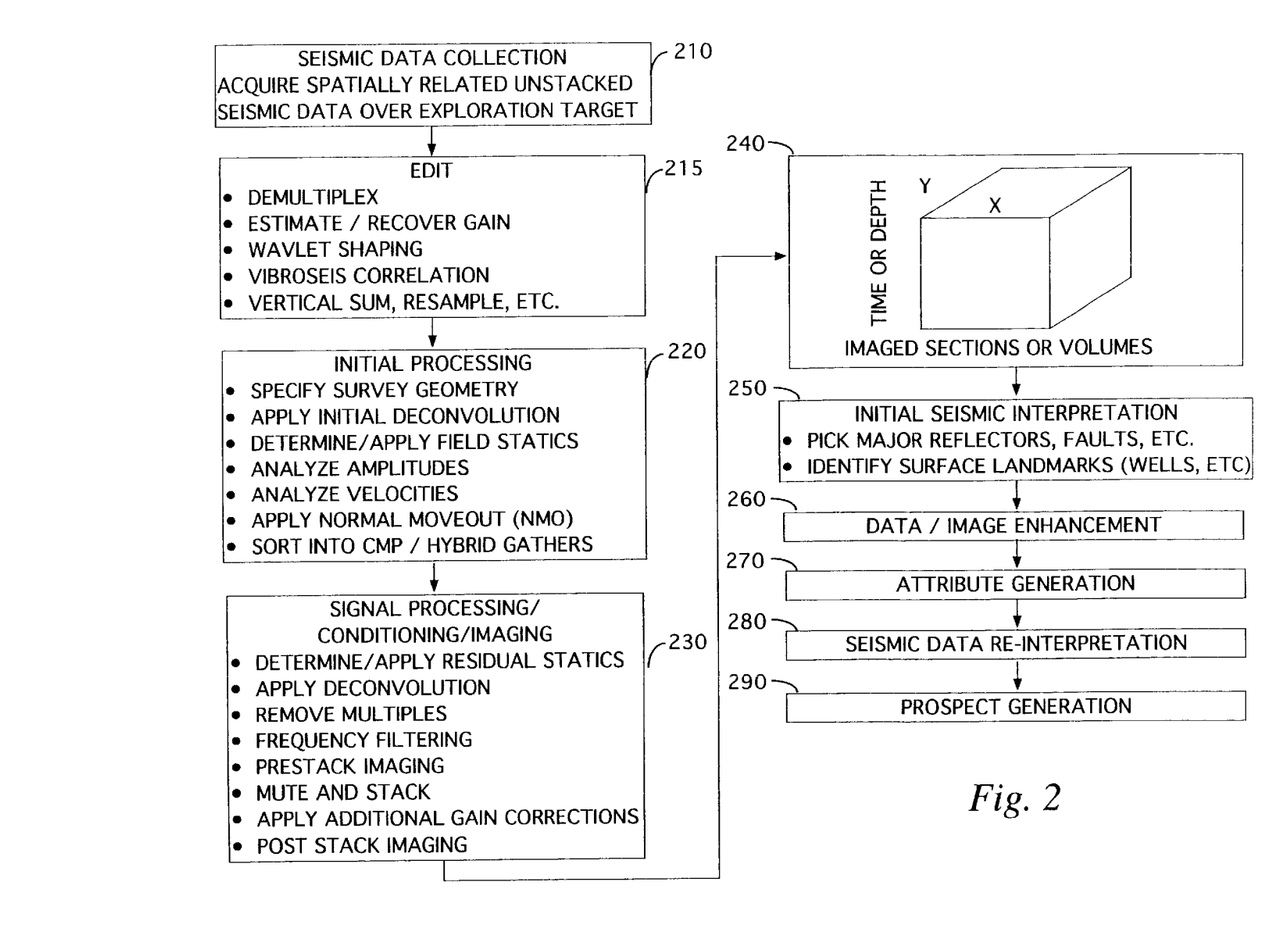
FIG. 2 is a schematic diagram that illustrates how the instant invention might be utilized within a conventional exploration seismic processing stream.

As a first step, and as is generally illustrated in FIG. 2, a 2D or 3D seismic survey is conducted over a particular subsurface earth volume (step 210). The data that are collected consist of unstacked (i.e., unsummed) seismic traces which contain digital information representative of rock layers within the volume of the earth lying beneath the survey. Methods by which such data are obtained in a form suitable for use by seismic processors and interpreters are well known to those skilled in the art. Additionally, those skilled in the art will recognize that the processing steps illustrated in FIG. 2 are only broadly representative of the sorts of steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

As is broadly illustrated in FIG. 2, seismic data typically pass through a number of processing steps before it is ready to be used by interpreters. A common early step is the specification of the geometry of the survey (step 220), at which time each seismic trace is associated with both the position of the physical receiver (or array) on or near the surface of the earth that recorded that particular trace, and the "shot" (or generated seismic signal) that provided the source for the recorded seismic energy. The shot-receiver location information is later used to determine the assigned position of the "stacked" seismic traces and for many other purposes.

After the initial pre-stack processing is completed, it is customary to condition the seismic signal on the unstacked seismic traces before creating a stacked (or summed) data volume (step 230). In FIG. 2, the "Signal Processing/Conditioning/Imaging" step 230 suggests a typical processing sequence, although those skilled in the art will recognize that many alternative processes could be used in place of the ones listed in the figure.

An ultimate goal of seismic processing is usually to produce a stacked seismic volume 240 or a stacked seismic line (2-D data). As is well known to those skilled in the art, a CMP gather is a collection of traces that all have the same midpoint between a shot and a receiver. A stack (or CMP stack) is horizontal sum of all the traces in a CMP gather, i.e., the numerical values from each trace at the same time point are summed together to produce a single output "stacked" trace that is an "average" of the input traces. Additionally, before stacking the traces it is customary to first correct them for offset from the shot ("normal moveout" or NMO, step 220), however the NMO correction will be assumed herein to be incorporated as part of the CMP stack and will not be considered separately.

The explorationist may do an initial interpretation 250 of the resulting stacked volume, wherein he or she locates and identifies the principal reflectors and faults wherever they occur in the data set. Finally, as noted in FIG. 2, the explorationist will then typically use the processed seismic data to locate subsurface structural or stratigraphic features conducive to the generation, accumulation, or migration of hydrocarbons (i.e., prospect generation 290). This effort may incorporate additional data from a variety of non-seismic sources including, for example, well logs, satellite surveys, gravity surveys, etc.

Another important use for seismic data is as a source for seismic attributes (step 270). As is well known to those skilled in the art, seismic attributes are values that are calculated from the seismic data and that serve to highlight some specific property or feature of the data that might not otherwise be observable within the original data. Although FIG. 2 seems to indicate that seismic attribute generation 270 takes place relatively late in the processing sequence, that is not always the case and attributes might potentially be calculated at almost any point in FIG. 2. Step 270 is one point in a typical seismic processing sequence that could include the methods of the instant disclosure. Since seismic attributes can reveal subsurface details that are at odds with the initial seismic data interpretation 250, the explorationist may use the result of step 270 to help refine or reinterpret (step 280) the original interpretation (250) before moving on to the prospect generation 290 stage.

As is suggested in FIG. 2, any digital sample within a seismic volume 240 is uniquely identified by an (X,Y,TIME) triplet: the X and Y coordinates representing some location on the surface of the earth, and the time coordinate measuring a distance down the seismic trace. For purposes of specificity only, it will be assumed that the X direction corresponds to the "in-line" direction, and the Y measurement corresponds to the "cross-line" direction, as the terms "in-line" and "cross-line" are generally understood to mean in the art. Although time is the preferred and most commonly encountered vertical axis unit, those skilled in the art understand that other units are certainly possible and might include, for example, depth or frequency. Additionally, it is well known to those skilled in the art that it is possible to convert seismic traces from one axis unit (e.g., time) to another (e.g., depth) using standard mathematical conversion techniques.

For purposes of the instant invention, data that are suitable for analysis by the methods disclosed herein might consist of, for purposes of illustration only, an unstacked 2-D seismic line, an unstacked 2-D stacked seismic line extracted from a 3-D seismic survey, an unstacked 3-D portion of a 3-D seismic survey, or, preferably, a portion of a stacked 3-D survey. The invention disclosed herein is most effective when applied to a group of unstacked seismic traces that have an underlying spatial relationship with respect to some subsurface geological feature. Again for purposes of illustration only, the discussion that follows will be couched in terms of traces contained within a stacked 3-D survey, although any assembled group of spatially related stacked or unstacked seismic traces could conceivably be used.

Theoretical Background

Figure 3:
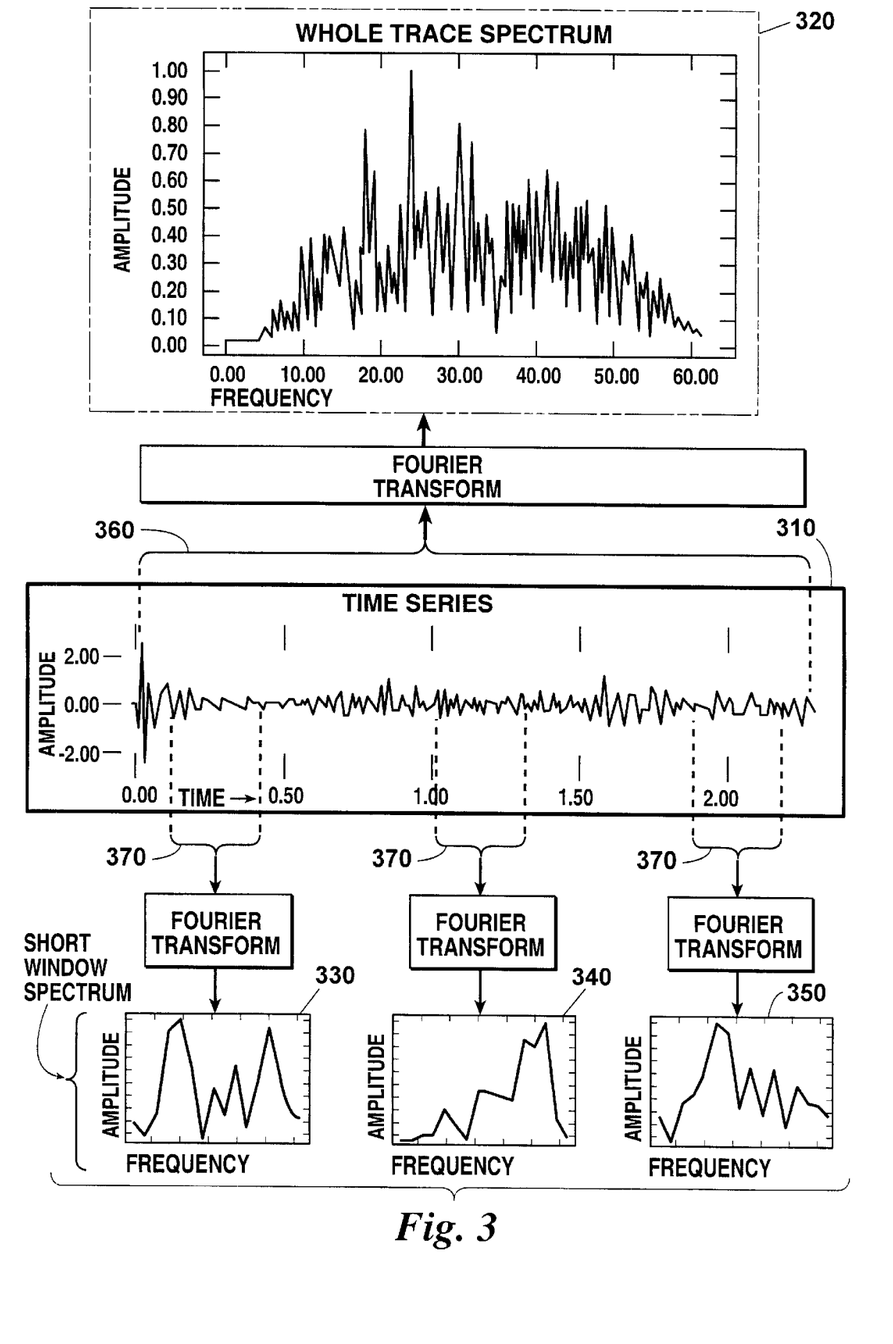
FIG. 3 contains examples of whole-trace and short-window Fourier transforms.

In FIG. 3 is illustrated a time series 310 together with various Fourier transform amplitude spectra computed therefrom. Spectrum 320 is computed over a relatively long window of seismic data (360), so its overall shape will tend to resemble the underlying seismic source wavelet. However, shorter windows 370 will tend yield spectra that are more affected by—and representative of—the underlying geology. (For a fuller discussion of this phenomena, see the invention taught by Gridley and Partyka in U.S. Pat. No. 5,870,691, the disclosure of which is incorporated herein by reference.) In either case, it should be clear to those of ordinary skill in the art that the calculated spectrum can take a variety of different shapes and those shapes might be a function of reflection time, position on the surface of the earth, length of the analysis window, or many other variables. Although either sort of analysis window (long or short) might used with the instant invention, in the preferred embodiment short windows will typically be used.

Technical Discussion

According to a first aspect of the instant invention, there is provided a method of seismic attribute generation for use in subsurface geophysical exploration which is based on an analysis of the general shape of the frequency spectrum calculated from at least a potion of a seismic trace.

Figure 4:
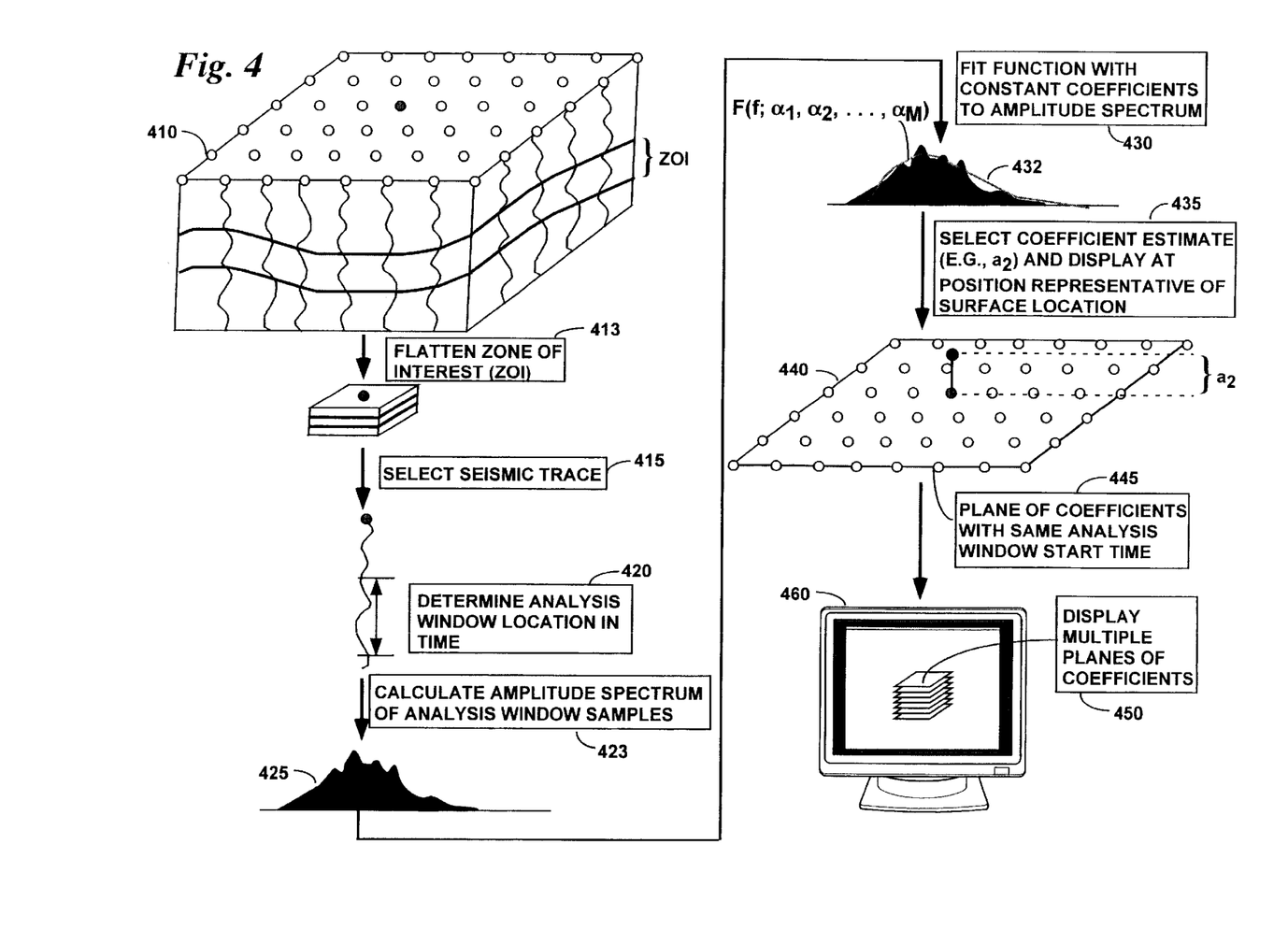
FIG. 4 is a schematic diagram that illustrates how the instant invention operates to produce a plane of seismic attributes.
Figure 5:
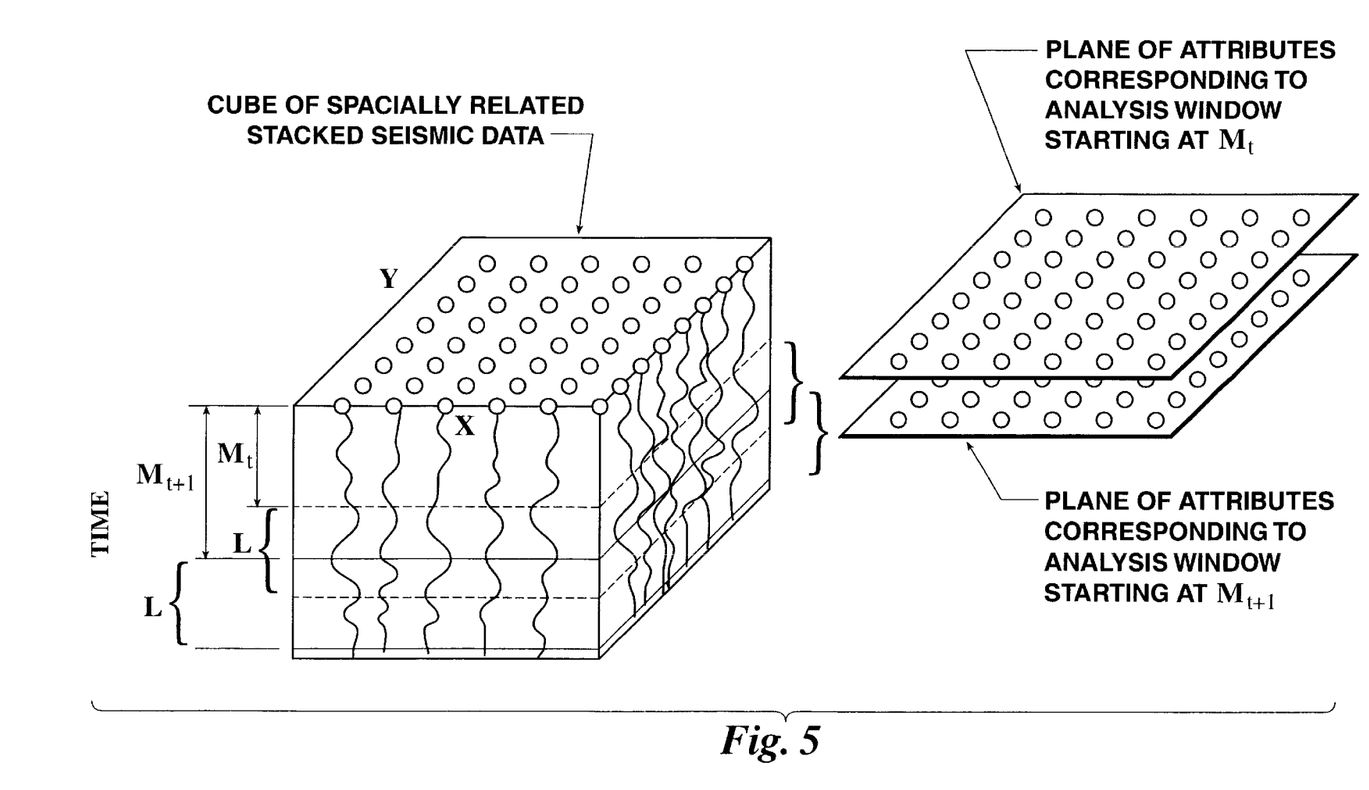
FIG. 5 illustrates how planes of seismic attributes produced by the instant method may be combined to form a seismic volume.

FIG. 4 contains a broad overview of the principle steps in the preferred embodiment. As a first step, a seismic data set 410 containing seismic traces is accessed. This data set might be a stacked 2D line or 3D volume, a collection of unstacked traces, or any other arrangement of stacked or unstacked traces that are relatable to a position on the surface of the earth. For purposes of illustration hereinafter, it will be assumed that a stacked 3-D seismic volume is used in the analysis.

The interpreter typically specifies a zone of interest within a particular 3-D volume. The zone of interest might be, by way of example, the undulating region bounded by two picked reflectors as is pictured in FIG. 4. In that case, the reflector is preferentially flattened or datumized (i.e., made flat by shifting individual traces up or down in time, step 413) before analysis, and possibly also palinspastically reconstructed. More conventionally, a specific bounded flat time interval (for example, from 2200 ms to 2400 ms) might be specified, thereby defining a "cube" or, more accurately, a "box" of seismic data within the 3-D volume: a sub-volume. Note that the zone of interest "sub-volume" might be so expansive as to include the entire seismic volume. Additionally, the lateral extent of the zone of interest may be delimited by specifying bounding "in-line" and "cross-line" trace limits. Other methods of specifying the zone of interest are certainly possible and have been contemplated by the inventor. The step of flattening the zone of interest 413 is not strictly required and would, of course, be unnecessary if the zone of interest were a "flat" slab of data. However, flattening an undulating zone of interest is a computational convenience for purposes of the steps that follow.

As a next step, a seismic trace is selected 415 and the zone of interest within this trace is identified. Then the location of the analysis window is determined 420 within the zone of interest and the particular samples that will be used in the next step are identified. The samples within the analysis window are then transformed via a Fourier transform and the amplitude spectrum 425 is computed (step 423) from the resulting transform coefficients. Note that a preferred variant of this step involves the computation of a composite amplitude spectrum which might be, by way of example only, the average of several short-window Fourier transform spectra that have been calculated within the same analysis window or zone of interest.

Additionally, it is preferable that a weighting function should be applied to the samples in the analysis window before they are transformed. In the preferred embodiment, the weight function will be a "Gaussian" weight. One popular definition of the Gaussian weight function is:

$$w(m) = \sigma_3 e^{-(m-L/2)^2/\sigma_2}, \quad m = 0, L-1$$
$$\sigma_1 = \frac{L}{6}, \quad \sigma_2 = 2\sigma_1^2, \quad \sigma_3 = \frac{1}{2\pi\sigma_1},$$

where "L" is the length of the data window. The previous equation was given only as an example and many other formulations are possible. In fact, any weight function that helps to mitigate the effects of the data window on the transform coefficients would be suitable. The previous steps are all well known to those skilled in the art and need not be discussed in any great detail herein.

Given the calculated spectrum 425, as a next step a function characterized by constant coefficients is fit (steps 430 and 432) to the spectral values 430. In terms of equations, let the digital samples within the selected seismic trace be represented by the variable x(i), where "i" could potentially vary between 1 and the number of samples in the seismic trace, "N" hereinafter. However, for purposes of specificity, it will be assumed hereinafter that the samples are drawn from an analysis window that is shorter than the length of the seismic trace, with the analysis window beginning at $M_t$ and being "L" samples in length. The Fourier transform coefficients calculated from these values will be represented hereinafter as X(i), i=0, L/2, and the amplitude spectrum A(i) is usually calculated as the complex magnitude of the corresponding Fourier transform coefficient:

$$A(i)=|X(i)|, i=0, L/2.$$

As a next step, a functional form is selected for fitting to the amplitude spectrum. The preferred functional form is a low-order polynomial, but many other functions could be used instead. In terms of equations, the selected function, F(·), hereinafter, will have one or more constant coefficients $\alpha_0, \alpha_1, \ldots, \alpha_M$, which are to be estimated from the spectral data. The constants are to be selected such that $$A(f)=F(f; \alpha_0, \alpha_1, \ldots, \alpha_M)$$

fits the spectral values, "A", as closely as possible, where inclusion of the parameter "f" indicates that F(·) is a function of spectral frequency. For example, the polynomial equation:

$$A(f)=F(f; \alpha_0, \alpha_1, \ldots, \alpha_M)=\alpha_0+\alpha_1 f+\alpha_2 f^2$$

describes a second order polynomial fit to the Fourier transform coefficients. In terms of matrices, the goal is to find a set of alpha coefficients that, as nearly as possible, fit the observed spectral amplitudes $$\begin{bmatrix} A(1) \\ A(2) \\ \vdots \\ A(L) \end{bmatrix} \approx \begin{bmatrix} 1 & f(1) & (f(1))^2 \\ 1 & f(2) & (f(2))^2 \\ \vdots & \vdots & \vdots \\ 1 & f(L) & (f(L))^2 \end{bmatrix} \begin{bmatrix} \alpha_0 \\ \alpha_1 \\ \alpha_2 \end{bmatrix},$$

where the quantity f(k) is preferably the "kth" Fourier frequency, $$f(k) = \frac{k}{L(\Delta t/1000)}, \quad k = 0, \frac{L}{2},$$

and $\Delta t$ is the sample rate in milliseconds. Alternatively, f(k) could be taken to be equal to the index "k" or any multiple thereof, since the Fourier frequencies are equally spaced for transforms calculated by a conventional discrete Fourier transform. Further, it might be desirable in some cases to transform the frequency axis to improve the quality the resulting fit. One way of doing that would be to set $$f(k)=k^p,$$

where the exponent "p" is chosen to in such as way as to expand or compress the frequency axis to improve the fit between the observed amplitudes and the chosen function. Nonlinear data transformations such as this—and others such as logarithms, powers, roots, etc.—are well known to those skilled in the art and need not be discussed further here. For further examples of these sorts of transformations see, for example, Daniel and Wood, *Fitting Equations to Data*, Wiley & Sons, 1971, or Mosteller and Tukey, *Data Analysis and Regression,* Addison-Wesley, 1977, the disclosures of which are incorporated herein by reference. Finally, it should be noted that the transform frequencies f(k) need not be equally spaced, in which case the previous approach would need to be modified slightly to use the actual frequency values as arguments (rather than the index "k").

In terms of equations, the previous matrix expression may be written more compactly as:

$$A \approx F\alpha,$$

where the symbol "≈" has been used to indicate that the unknown constants (alpha) are to be chosen such that the left and right sides of the equation are as nearly equal as possible; where the matrix of Fourier frequencies (or transformations, thereof) has been represented as "F"; and where the vector of unknown coefficients has been designated as "α". It is well known to those skilled in the art that under standard least squares theory, the choice of the coefficient vector that minimizes the difference between A and Fα is $$a=(A^T A+\epsilon I)^{-1} AF$$

where the superscript "−1" indicates that a matrix inverse is to be taken. In the previous equation, a is a vector of coefficient estimates, the quantity I represents the M by M identity matrix (3 by 3 in the previous example), and $\epsilon$ is a small positive number which has been introduced—as is commonly done—for purposes of stabilizing the matrix inversion. Finally, those skilled in the art will recognize that the least squares minimization of the previous matrix equation is just one of many norms that might be used to constrain the instant problem and thereby yield a solution in terms of the unknown alphas, some alternatives norms being, by way of example only, the $L_1$ or least absolute deviation norm, the $L_p$ or least "p" power norm, and many other hybrid norms such as those suggested in the statistical literature on robust estimators. See, for example, Peter J. Huber, *Robust Statistics,* Wiley, 1981, the disclosure of which is incorporated herein by reference. Further, non-linear equations such as:

$$F(f;\alpha_0, \alpha_1, \alpha_2, \alpha_3)=\alpha_0 e^{(\alpha_1+\alpha_2 f)}+\alpha_3 f$$

may also be used, although the previous (linear) method of solving this sort of (nonlinear) equation would need to be modified according to methods well known to those skilled in the art.

Further, it should be noted that instead of using the spectral amplitude of each transformed analysis window, any other quantity that is computed from the Fourier transform coefficients could have been used instead. For example, a function could be fit to the phase spectrum (preferably after first "unwrapping the phase" as that term is known to those skilled in the art). Alternatively, the original complex Fourier transform coefficients could have been used in the fit, although the previous matrix might need to be separated into separate "real" and "imaginary" equations in order to obtain a solution. Still further, smoothed spectra (including the integrated spectra or a cumulative sum of the spectral values) could also be used as could mathematical functions of the individual spectral or Fourier transform coefficient values (e.g., square roots, logarithms, inverse, roots, numerical derivatives, etc.). In the preferred embodiment, the cumulative amplitude spectrum is used in the fitting process and the preferred fitting function is a first order polynomial (i.e., a linear equation).

The alpha coefficient estimates that are produced by this process provide a wealth of seismic attributes which may be mapped and analyzed by the explorationist: at least as many attributes are produced as there are constants in the fitted equation. In the preferred embodiment, all of the coefficients that are calculated within each analysis window are written to output as separate planes (in the case of 3D data) of output. Thus, if a linear equation is fit to the spectra, at least two planes of coefficients would preferably be produced. Additionally, it is preferred that the residual to the fit (e.g., the parameter "SSE" as discussed below) is also written to output, thus yielding a third attribute "slice" that is preferably produced from a fit of a linear functional form.

Some examples are given hereinafter of how these coefficients may be used in practice, but the suggestions detailed below represent only a few of the many uses to which these coefficients may be put. In the event that a second order polynomial is fit to the amplitude spectrum, the sign of the coefficient associated with the quadratic term ($\alpha_2$ in the previous example) will tend to reflect whether the spectrum is "bowl" shaped (e.g., with a pronounced notch in the spectrum, e.g., FIG. 3, item 330) or "hump" shaped (as it is illustrated in FIG. 4, item 425), with a positive estimated coefficient value tending to indicate a spectrum having a bowl shape. Similarly, if a first order (linear) equation is fit to the unwrapped phase, the linear regression component of the fit will tend to reflected any time shifts that are present in the data, it being well known that a time-domain shift is expressed in the phase spectrum as a linear trend. Clearly, it would be impractical to list here all of the possible interpretations of the many different calculated coefficients (and mathematical combinations of those coefficients) that might be used: the interpretation of each coefficient will necessarily be based on the particular function fitted. Those of ordinary skill in the art will be able to device any number of fitting functions and corresponding coefficient interpretations.

Another quantity that is may be calculated in connection with the fitting process is the degree to which the data are adequately "fit" by the selected equation within each analysis window. The statistical Coefficient of Determination, "r" or "$r^2$" as that quantity is known to those skilled in the art, is one conventional measure of the "goodness of fit" of selected equation to the data (e.g., spectral values). A large value of $r^2$ (i.e., a value near 1.0) indicates that the data are well fit within that window level by the selected equation. However, a value of $r^2$ near zero signifies that the Fourier transform coefficients analyzed within that particular window are not well fit by the selected equation. Statistical coefficients related to the quality of the fit will be considered hereinafter to be another fitted constant parameter.

According to another aspect of the instant invention, there is provided a method substantially as described above, but wherein display of the calculated coefficient is contingent on the value of the correlation or on some other goodness of fit parameter. In the preferred embodiment, the seismic data will be pre-processed as described previously and a zone of interest and analysis window length will be selected by. the seismic processor. Then a trace is read, and the data samples in the analysis window are extracted, and the samples are transformed via a Fourier transform as before. The spectrum is then formed and is fit using the functional form of choice and, additionally, the coefficient of determination is calculated for the fit. However, rather than directly storing or displaying the calculated coefficient as a seismic attribute, the Coefficient of Determination is first compared with some predetermined value. Then, depending on the results of the comparison, either the calculated value or some other value will be displayed. For example, consider the following rule that displays the original coefficient estimate if the Coefficient of Determination is "high" (i.e., the fit is relatively good) and the value "zero" if the coefficient is "low":

$$y(M_t) = \begin{cases} a_2, & r^2 > d \\ 0, & \text{else,} \end{cases}$$

where $y(M_t)$ is a storage area (typically an empty seismic trace) for receiving the seismic attribute calculated from an analysis window that begins at sample $M_t$; where $r^2$ is the Coefficient of Determination for the fit for of a spectrum calculated from an analysis window that begins at time $M_t$, where $a_2$ is the calculated estimate of the parameter $\alpha_2$, and where "d" is an arbitrary positive value selected in accordance with the discussion that follows.

Those skilled in the art know that in regression analysis, the Coefficient of Determination is a statistical measure of causal association between two variables, where the higher the numerical value (on a scale of 0.0 to +1.0) the greater the degree of association. More formally, this statistic is a measure of the proportion of the total variation in the predicted variable that is associated with variations in the predictors in the regression equation. Thus, a Coefficient of Determination of, say, 0.85 means that 85% of the variance in the predicted variable is attributable to the regression model, whereas 15% is unexplained. In brief, values of the Coefficient of Determination near 1.0 indicate that the data are well fit by the regression model, whereas values near zero indicate that a poor fit with the model. Although there are many ways to express the computational formula for the Coefficient of Determination, a preferred way to do so is as follows:

$$r^2 = \frac{\sum_{m=0}^{(L-1)/2}[X(m) - \overline{X}]^2 - \sum_{m=0}^{(L-1)/2}[X(m) - a_0 - a_1 f(m) - a_2 f(m)^2]^2}{\sum_{m=0}^{(L-1)/2}[X(m) - \overline{X}]^2}$$

$$= \frac{\text{Mean } SS - SSE}{\text{Total } SS}$$

where $\overline{X}$ is the average of the spectral values $X(\cdot)$ within an analysis window of length "L"; where $a_0$, $a_1$, and $a_2$ are estimated alpha coefficient values (for the quadratic example discussed previously); where "Mean SS" is the sum of squares about the mean (the first term in the numerator); and, "SSE" is the sum of squares due to lack of fit by the regression (the second term in the numerator). Those skilled in the art will recognize that there are many other ways to formulate the Coefficient of Determination. However, the essential feature of this statistical measure is that it returns some indication of the goodness of fit of the chosen functional form to the spectral data within that analysis window.

In terms of the instant embodiment, relatively larges values of the Coefficient of Determination indicate that the seismic data at those time levels are well fit by the chosen functional form. Thus, in this instant embodiment, the calculated coefficient is presented to the explorationist only for those analysis windows that have an associated $r^2$ that is high, i.e., "near" 1.0. One preferred choice for the parameter "d" is about 0.50, although the value that works best for a given functional form and data set may need to be determined by trial and error. In the alternative, of course, the calculated coefficient might be presented to the explorationist only for those analysis windows with values of $r^2$ near zero, however the interpretation of the resulting display would then be different.

For those coefficients that correspond to low values of $r^2$, a constant replacement value is preferably used to indicate that fact. In the preferred embodiment, and as is illustrated in the previous equation, the value zero has been selected as the substitute value. However, "zero" was selected for purposes of convenience only and many other choices might be used instead. A main purpose of using a single constant replacement value is to make inferior functional fits readily recognizable by the explorationist who will be viewing and analyzing the output from this method.

A display of seismic attributes formed in this manner provides a means for the explorationist to rapidly identify within a section or volume those locations in time and space where the data are accurately fit by the selected functional form. This display would also allow the explorationist to quickly locate regions of poor fit throughout an entire seismic section or volume.

Finally, it should be noted that in the text and claims that follow the words "fitting a function characterized by constant coefficients" should be broadly interpreted to include fitting a function to the spectral data and then determining a statistical quantity based on the resulting fit, e.g., calculating $r^2$, the Coefficient of Determination, etc. Thus, the end product of such a fit—the seismic attribute—is the statistical estimate produced by this process.

Other Basis Functions and Weight Functions

Those of ordinary skill in the art will recognize that, although the present invention is discussed herein in terms of the discrete Fourier transform, in reality the Fourier transform is just one of any number of discrete time data transformations that could used in exactly the same fashion. The general steps of (1) selecting an analysis window; (2) calculating a data transformation from the samples within that window; (3) fitting a function characterized by constant coefficients to the resulting transform coefficients (or mathematical functions of those coefficients); and, (4) selecting one of the coefficient estimates to use as a seismic attribute, could be accomplished with a wide variety of discrete data transformations other than the Fourier. If the transformation is other than a Fourier, the only real changes are that the resulting transform coefficients/spectrum will be interpreted in terms of the underlying basis functions (rather than in terms of frequency) and changes in the shape of transform coefficients may be also interpreted differently.

Those skilled in the art will understand that a discrete Fourier transform is just one of many discrete linear unitary transformations that satisfy the following properties: (1) they are linear operators that are (2) exactly invertible, and (3) their basis functions form an orthonormal set. For the discrete Fourier transform, the basis functions corresponding to a forward transform of length L are conventionally chosen to be the set of complex exponentials and each transform coefficient corresponds to the strength of a particular a frequency in the data. By way of a specific example of how an alternative transform could be used, those skilled in the art understand that a discrete Walsh transform could be used in place of the Fourier transform and the Walsh coefficients similarly fitted, displayed, and analyzed. In the manner disclosed above, a Walsh transform may be computed within an overlapping series of sliding windows and the coefficients resulting therefrom subjected to a functional fit as described previously. Rather than the calculated transform coefficients representing frequency, of course, these coefficients instead represent a similar quantity called "sequency" by those skilled in the art. Other examples of transforms that might prove to useful in particular settings include, without limitation, Hartley transforms, Fourier Sine and Fourier Cosine transforms, and wavelet transforms.

Finally, the weight/tapering function discussed previously could take any number of forms. Some of the more popular data windows are the Hamming, Hanning, Parzen, Bartlett, and Blackman windows. Each of these functions has certain advantages and disadvantages. However, the Gaussian taper is in many ways optimal for this application.

Conclusions

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. By way of example, other algorithms may be used to calculate the right pseudo-inverse matrix. Moreover, equivalent computations may be substituted for those illustrated and described. Also certain features of the invention may be used independently of other features of the invention.

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of some examples of trace data other than conventional seismic data that would be suitable for use with the invention disclosed herein, the same approach described herein could be used to process and/or analyze multi-component seismic data, shear wave data, converted mode data, VSP data, magneto-telluric data, cross well survey data, full waveform sonic logs, or model-based digital simulations of any of the foregoing. Additionally, the methods claimed hereinafter can be applied to mathematically transformed versions of these same data traces including, for example: frequency domain Fourier transformed data; transformations by discrete orthonormal transforms; wavelet-transformed data; instantaneous phase traces, instantaneous frequency traces, the analytic and quadrature traces; etc. Additionally, the methods claimed herein after can be applied to mathematically transformed versions of these same data traces including, for example: frequency domain Fourier transformed data; transformations by discrete orthonormal transforms; instantaneous phase traces, instantaneous frequency traces, quadrature traces, and analytic traces, etc. In short, the process disclosed herein can potentially be applied to any geophysical time series, but it is preferably applied to a collection of spatially related time series containing structural or stratigraphic information. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration, wherein there is provided a seismic survey consisting of seismic traces containing digital samples collected over a predetermined volume of the earth containing subsurface features conducive to the generation, migration, accumulation, or presence of hydrocarbons, comprising the steps of:

(a) selecting a particular seismic trace, said seismic trace having at least two digital samples contained therein;

(b) choosing an analysis window containing at least two of said at least two digital samples;

(c) transforming said at least two digital samples using a discrete orthonormal transformation, said discrete orthonormal transformation producing transform coefficients from said digital samples so transformed;

(d) fitting a function characterized by at least one constant coefficient to said transform coefficients, thereby producing at least one coefficient estimate; and, (e) forming a seismic attribute from any coefficient estimates so calculated, said seismic attribute for using in identifying said subsurface features conducive to the generation, migration, accumulation, or presence of hydrocarbons.

2. A method of seismic exploration according to claim 1, wherein step (d) includes the steps of:

(d1) calculating an amplitude spectrum from said transform coefficients, and, (d2) fitting a function characterized by at least one constant coefficient to said amplitude spectrum, thereby producing at least one coefficient estimate.

3. A method of seismic exploration according to claim 1, wherein step (d) includes the steps of:

(d1) calculating a phase spectrum from said transform coefficients, and, (d2) fitting a function characterized by at least one constant coefficient to said phase spectrum, thereby producing at least one coefficient estimate.

4. A method of seismic exploration according to claim 1, further including the step of:

(f) storing said seismic attribute.

5. A method of seismic exploration according to claim 4, wherein steps (a) through (f) are repeated a predetermined number of times, wherein a predetermined number of different particular seismic traces are selected, and, wherein a predetermined number of seismic attributes are formed from said predetermined number of different particular seismic traces.

6. A method of seismic exploration, wherein are provided stored seismic attributes prepared according to the method of claim 5, comprising the steps of:

(a) accessing said stored seismic attributes; and, (b) displaying any of said stored seismic attributes so accessed.

7. A method of seismic exploration according to claim 1, wherein step (d) includes the steps of:

(d1) fitting a function characterized by at least one constant coefficient to said transform coefficients, thereby producing at least one fitted coefficient estimate, and, (d2) calculating at least one statistical measure of fit based on any of said at least one fitted coefficient estimates, thereby producing a coefficient estimate.

8. A device adapted for use by a digital computer wherein a plurality of computer instructions defining the method of claim 1 are encoded, said device being readable by said digital computer, said computer instructions programing said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

9. A method of seismic exploration, wherein there is provided a seismic survey consisting of seismic traces containing digital samples collected over a predetermined volume of the earth containing subsurface features conducive to the generation, migration, accumulation, or presence of hydrocarbons, comprising the steps of:

(a) selecting a particular seismic trace, said seismic trace having at least two digital samples contained therein;

(b) choosing an analysis window containing at least two of said at least two digital samples;

(c) transforming said at least two digital samples using a discrete orthonormal transformation, said discrete orthonormal transformation producing transform coefficients from said digital samples so transformed;

(d) fitting a function characterized by at least one constant coefficient to said transform coefficients;

(e) determining at least one goodness of fit value corresponding to said functional fit of step (d); and, (f) forming a seismic attribute from any goodness of fit values so determined, said seismic attribute for using in identifying said subsurface features conducive to the generation, migration, accumulation, or presence of hydrocarbons.

10. A device adapted for use by a digital computer wherein a plurality of computer instructions defining the method of claim 9 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

11. A method of seismic exploration according to claim 9, further including the step of:

(g) storing said seismic attribute.

12. A method of seismic exploration according to claim 9, wherein steps (a) through (f) are repeated a predetermined number of times, wherein a predetermined number of different particular seismic traces are selected, and, wherein a predetermined number of seismic attributes are formed from said predetermined number of different particular seismic traces.

13. A method of seismic exploration, wherein are provided stored seismic attributes prepared according to the method of claim 9, comprising the steps of:

(a) accessing said stored seismic attributes; and, (b) displaying at least a portion of said stored seismic attributes.

14. A method according to claim 13, wherein the step of displaying at least a portion of said stored seismic attributes includes the further step of recording visually perceptible images representative of said stored seismic attributes on a generally flat medium.

15. A method according to claim 14, wherein said generally flat medium includes a computer monitor.

* * * * *